Nov. 14, 1950     B. G. COPPING     2,530,045
DISPENSING APPARATUS
Filed July 18, 1946     2 Sheets-Sheet 1
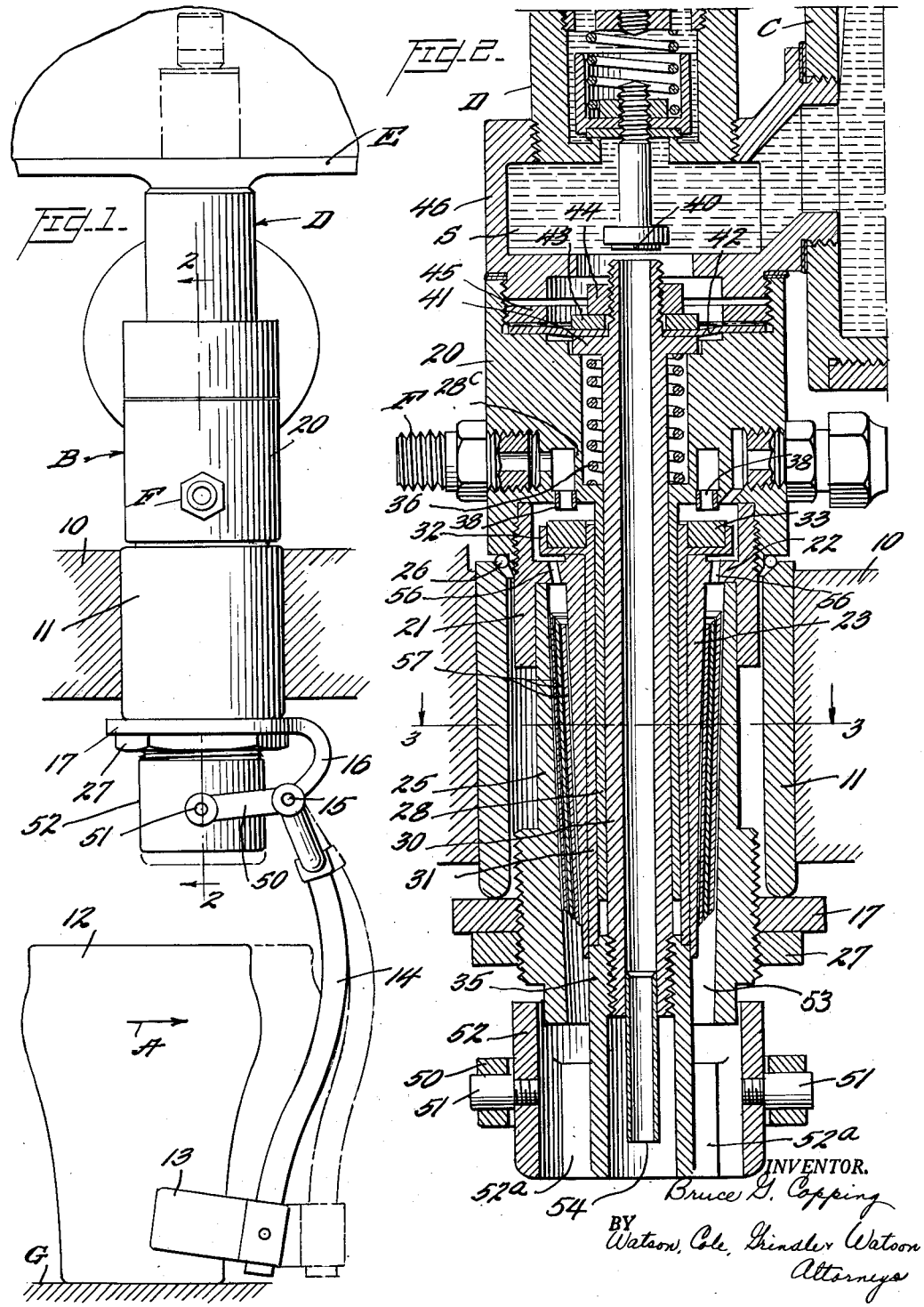
INVENTOR.
Bruce G. Copping
BY
Watson, Cole, Grindle & Watson
Attorneys

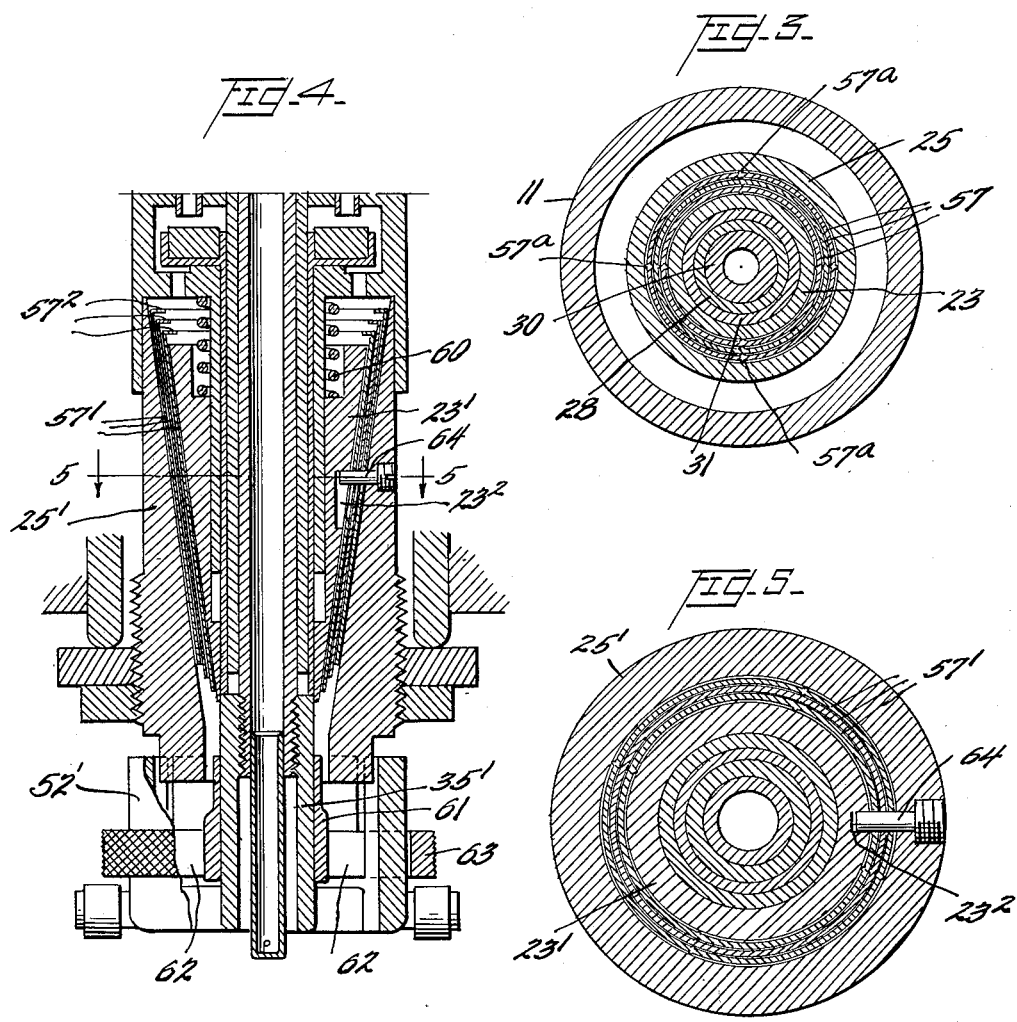

Patented Nov. 14, 1950

2,530,045

UNITED STATES PATENT OFFICE 2,530,045

DISPENSING APPARATUS

Bruce G. Copping, Atlanta, Ga., assignor to The Coca-Cola Company, Wilmington, Del., a corporation of Delaware Application July 18, 1946, Serial No. 684,398

7 Claims. (Cl. 138—46)

This invention relates to dispensing apparatus and particularly to apparatus for dispensing liquids.

Numerous types of manually or automatically operated liquid dispensing devices have heretofore been and are currently employed to effect the controlled discharge of measured quantities of liquid into containers. The automatically operating type of liquid dispensing apparatus is customarily employed in the charging of containers which are to be subsequently closed and sealed and the manually operable type of such apparatus is usually utilized in effecting the discharge of measured quantities of liquid, intended to be immediately consumed, into open containers. The physical nature of the liquid to be handled in each instance determines to a substantial extent the characteristics of the apparatus for effecting its controlled discharge into the waiting container, and, in addition, the pressure head upon the liquid in the reservoir in which it is stored is a factor having an important bearing upon the design of such an apparatus. Again, that characteristic of a liquid to be dispensed which causes it to foam when agitated has heretofore led to the development of liquid dispensing devices designed and intended to deliver the liquid into a waiting container from a source of supply with the least possible amount of agitation and hence with the least possible creation of foam. The problem of design of a device for effecting the controlled discharge of liquid is furthermore rendered materially different in any case in which the liquid to be dispensed is charged with a gas in solution, as in the case of carbonated water, the carbon dioxide gas of carbonated water escaping from the carrier liquid quite rapidly with reduction in pressure, so much of the dissolved gas escaping from a stream of carbonated water which is suddenly relieved of all pressure above atmospheric as it issues in a turbulent manner from an orifice, that but little remains in the liquid which reaches the container or vessel from which it is to be withdrawn by the consumer.

The present invention has for an object the provision of an improved dispensing device for liquids which tend to foam when agitated, the invention providing a means for delivering such a liquid as a rapidly flowing controlled current but without agitation, so that it will reach the container in which it is to be dispensed or packaged in a comparatively quiescent condition, foaming being minimized. The invention has particular utility, however, in dealing with liquids which contain gas in solution and must necessarily pass from vessels in which they are stored under relatively high pressures, rather quickly into containers or vessels open to atmospheric pressure, a very large pressure drop occurring in a relatively short time so that the tendency for the gas to escape is great. When dealing with carbonated liquids such as carbonated water it is not only helpful to cause the stream of liquid passing from the storage vessel into a container which is open to the atmosphere to flow through a conduit which is so designed that turbulence is either wholly prevented or minimized, but it is also helpful to so conduct the liquid on its way to the discharge port of the dispensing means in such manner that there is a gradual instead of a sudden pressure drop, rapid evolution and waste of gas from the issuing liquid being minimized when the liquid is discharged at relatively low velocity and pressure. The discharge mechanism which comprises the subject matter of the present invention is of such nature that a stream of carbonated water can be delivered into a vessel at atmospheric pressure in a superior manner, a gradual pressure drop not only being effected and gas liberation retarded for this reason, but a non-turbulent flow being likewise realized, the net result being a product, i. e., a body of liquid in a container under atmospheric pressure only, which contains more of its original gas content that does the product of any other type of dispensing mechanism heretofore suggested or used.

Numerous forms of the invention are contemplated and in adapting it for the dispensing of liquids of various characteristics the design and arrangement of its component elements may be considerably varied. Those embodiments which are illustrated in the accompanying drawings and which are hereinafter described in detail are therefore set forth by way of example only.

In the drawings:

Figure 1 is a side elevation of a dispensing means which includes the novel liquid flow controlling device, Figure 2 is a section on line 2—2 of Fig. 1 but upon a somewhat larger scale, Figure 3 is a section taken on line 3—3 of Figure 2, Figure 4 is an axial section through portion of a modified form of dispensing mechanism for liquids under pressure, Figure 5 is a section on line 5—5 of Figure 4.

In the dispensing of carbonated beverages the time element is of primary importance and it is highly desirable to provide a mechanism which may be quickly operated repeatedly, by one who may not be particularly skilled, but which will nevertheless insure the delivery to each successive patron of an identical beverage, containing the same proportion of flavoring syrup to carbonated water, and which also contains the maximum amount of dissolved gas. In order to attain this objective the dispensing apparatus must embody a number of instrumentalities which cooperate in achieving the desired result and an apparatus of this character is illustrated and will now be described in detail. The dispensing apparatus for carbonated beverages is frequently placed in the hands of the unskilled and it is, therefore, a particular concern of the applicant to provide such a mechanism which may be operated quickly, surely and without the exercise of technical knowledge, in order to best serve public demand, and which is at the same time rugged, durable, and easily cleanable after use.

A portion of a horizontal support is indicated at 10 in the drawings this support being provided with a vertical cylindrical aperture within which the tube 11 is received, this tube comprising a base for supporting the major portion of the dispensing apparatus in such manner that it may be readily removed when necessary. This apparatus comprises the vertically elongated body generally indicated at B, and which is provided with ducts through which the carbonated water and the flavoring syrup are led downwardly in parallel streams to a point of discharge into a waiting receptacle, and also the body C of the metering device for the flavoring syrup and a tubular member D extending upwardly to the underside of a storage tank E for flavoring syrup. A conduit F is provided for leading carbonated water from a reservoir where it is stored under pressure to an aperture formed in the body B just above the support 10 the arrangement being such that the liquid flavoring syrup will flow into the dispensing apparatus from above, by gravity, while the carbonated water under pressure is led from any conveniently located flask to a point intermediate the upper and lower ends of the body B of the apparatus.

Directly below the lower end of the dispensing apparatus is positioned a support G for a receiving vessel such as a glass, as indicated in Figures 1 at 12, the carbonated water and syrup which issue from the discharge ports in the lower end of the dispensing apparatus entering the open mouth of the glass when the glass is in the position in which it is illustrated in dotted lines. To reach this position the glass must be moved in the direction indicated by the arrow A (Figure 1) the glass first engaging and then laterally displacing, from the position in which it is shown in full lines to the position in which it is shown in dotted lines (Figure 1), the bracket member 13. Bracket 13 is secured to the lower end of the depending arm 14, this generally vertically extending arm being hung by a pivot member 15 from a downwardly and inwardly curving arm 16 which in turn comprises an integral extension of an annular member 17 which encircles the body B of the apparatus and has threaded engagement therewith so as to be vertically adjustable thereon. The displacement of depending arm 14 effects operation of valves controlling the flow of both carbonated water and flavoring liquid to the discharge ports of the apparatus and the flow will be maintained so long as the glass is held in the position in which it is shown in dotted lines, the operator removing the glass when filled and being required at no time while the reservoirs which supply the liquid ingredients remain charged, to perform any operation other than to place successive empty receptacles below the dispensing nozzle and remove each one after filling.

The body B of the dispensing apparatus comprises a number of relatively simple parts assembled together, and which may be readily disassembled for the purpose of inspection, cleaning, or repair, if necessary. A major portion thereof comprises the exteriorly cylindrical member 20 which is provided with a radially extending threaded aperture for the reception of the end of the carbonated water supply tube F and an axial aperture therethrough, various portions of which are of different diameters as readily perceived from an inspection of Figure 2. At its lower end the cylindrical recess formed in member 20 is of relatively large diameter and is internally threaded to receive the externally threaded upper end of a tubular member 21. Member 21 includes as an integral portion an annular inwardly extending flange 22, approximately midway between its upper and lower ends and, formed integrally with the flange 22, a tubular core 23, this core extending downwardly for a substantial distance below the lower end of member 21. The inner surface of this core is truly cylindrical and coaxial with cylindrical member 21 and its outer surface is frusto-conical, tapering downwardly very gradually from flange 22 to its lower end. Below member 21 and coaxial therewith is a tubular element 25 the upper end of which is telescoped within and rigidly secured to member 21, the inner surface of this tubular element 25 being frusto-conical with a downward taper and coaxial with the frusto-conical outer surface of the core 23, both frusto-conical surfaces having the same angle of taper with their common axis so that these mutually facing surfaces define between them a duct which is annular in cross section, which decreases in inner and outer diameter from top to bottom, but which is of constant width. It is upon the enlarged lower end of element 25, which is exteriorly threaded, that the annular member 17 previously referred to is mounted, and in the installation of the dispensing apparatus the body B is passed downwardly through the tube 11, which has been previously affixed to the support 10, until the lower annular shoulder of the body member 20 contacts with the annular upper end of tube 11, or with a washer element 26 interposed between mutually facing frusto-conical surfaces of shoulder and tube, the member 17 then being applied and adjusted upwardly until its upper surface closely engages the lower end of tube 11, a lock nut 27 then being applied to maintain annular member 17 in this position, the tube 11 being thus firmly clamped and the dispensing apparatus tightly affixed to the support, but in such manner as to be readily removable.

Member 20 has integral therewith a part indicated at 28 and which is generally tubular in form, the lower portion of this elongated tube having cylindrical coaxial inner and outer surfaces its outer surface being concentric with and equidistantly spaced throughout from the cylindrical inner surface of the core 23. The body member 20 and its depending tubular portion 28 are connected by an intermediate relatively short tubular portion 28c which is of larger interior diameter than the depending guide portion 28 and of smaller external diameter than member 20, as clearly shown in Figure 2.

Supported within and guided by the depending guide portion 28 of part 20 is a vertically reciprocable tubular member 30 hereinafter referred to as the duct for leading downwardly a metered flow of flavoring syrup when the dispensing apparatus is in operation and slidably engaging the outer surface of the guide 28, is the cylindrical hollow stem 31 of a valve generally indicated at 32 and located in the recess formed in the upper end of member 21, valve 32 being annular in form with an upwardly opening recess to receive an annulus 33 of cork, rubber or the like. When the apparatus is in operation the part 28 remains stationary at all times whereas the duct 30 may be vertically reciprocated, and likewise the valve 32.

At its lower end the liquid duct 30 is exteriorly threaded to receive the interiorly threaded upper end of a cylindrical nozzle part 35, part 35 having an exterior shoulder at its top to receive the lower end of the cylindrical valve stem 31. It is clear that, because of this arrangement, vertical elevation of the nozzle part 35 will result in upward movement, not only of the duct 30, but also of the valve stem 31 and the valve mounted on the upper end of the stem. Normally a spring 36 which encircles the upper end of duct 30 and which is housed within the bore in the upper portion of part 28, maintains the duct 30, nozzle member 35, and valve 32 in the positions in which they are illustrated in Figure 2, with the annular lower ends of the short inserted tubes 38 of member 20, and the upper end of duct 30 seated against the downwardly facing surface of a valve 40, duct 30 being provided at its upper end with an outwardly projecting flange 41 which comprises an abutment for the upper end of the helical spring 36. Encircling the upper end of duct 30, just above flange 41, is an annular flexible diaphragm 42 the inner margin of which is tightly clamped between flange 41 previously referred to and an annular washer 43 which is maintained in clamping engagement with the diaphragm by a nut 44 having threaded engagement with the exteriorly threaded upper end of duct 30. The outer margin of diaphragm 42 is tightly clamped between an upwardly facing shoulder of member 20 and a clamping ring 45 having threaded engagement with the threaded interior wall of the cylindrical bore formed in the upper end of member 20. The upper end of duct 30 is at all times positioned within a chamber S, one wall 46 of which is mounted upon the upper end of member 20 as shown, this chamber containing a body of syrup or other liquid to be dispensed and it is a function of the diaphragm 42 to prevent the downward leakage of this liquid through the space around the duct 30 while permitting the duct to move vertically in the manner previously described in order that its upper end may be closed by being brought tightly against the valve 40 or may be opened to permit the inflow of liquid (Figure 2).

This downward vertical movement of duct 30 is, as aforesaid, and likewise the movement of valve 32, effected by applying a downwardly directed force to the nozzle part 35 and this force is transmitted to the nozzle when the receptacle 12 is moved from the position in which it is shown in full lines to the position in which it is shown in dotted lines (Figure 1), the pivoted arm 14 having rigidly attached to its upper end a laterally extending bifurcated part 50 the arms of which are provided at their ends with aligned cylindrical apertures to receive, respectively, the outer ends of cylindrical pins 51, the inner ends of these pins being fixed in a sleeve 52 encircling and concentric with the tubular nozzle part 35 previously described. Radial webs 52a connect the sleeve 52 to the nozzle part 35 so that the nozzle part 35 is lowered when the sleeve 52 is depressed by the action of the operator in bringing a glass or other vessel into filling position, the spring 36 effecting upward movement of the nozzle part and its connected sleeve 52 when the receiving vessel is removed, the depending arm 14 being simultaneously moved from its dotted line to its full line position.

It is apparent, therefore, that the mechanism so far described provides a valve-controlled duct leading downwardly from a body of flavoring syrup, and a valve-controlled duct leading downwardly from the annular chamber 53 formed in member 20, and which chamber is at all times in open communication with the conduit F leading from the source of carbonated water under pressure, and that these valves are simultaneously opened and closed, being normally maintained in closed position by the action of the spring 36, but being readily opened and maintained in open position as long as desired by the action of the operator in placing a receiving vessel in position to be charged. The duct 30 is of simple nature providing a direct channel for the downward flow of liquid by gravity, this duct being of relatively large diameter and being preferably but not necessarily provided with a thin walled discharge tube 54 at its lower end. The duct for carbonated water, however, includes the annular channel defined by the mutually facing inner and outer frusto-conical surfaces of member 25 and core 23, the upper end of this annular channel communicating with the chamber within which valve 32 is housed through short ducts 56 formed in the annular flange-like portion 22 of member 21. This portion of the carbonated water duct likewise contains one or more relatively thin frusto-conical members 57, of which three are shown in Figures 2 and 3 of the drawings, these members being nested, as shown.

The frusto-conical outer face of the outermost or largest member 57 is maintained in spaced relationship to the frusto-conical inner face of member 25 by means of spacing ribs 57a integral with member 57, so that there is a space between these surfaces which is approximately 2/1000 or 3/1000 of an inch in width, measured radially of the axis of the nozzle. Similarly the mutually facing surfaces of the core 23 and the innermost frusto-conical member 57 are similarly spaced apart, likewise the mutually facing surfaces of the respective members 57. By reason of this arrangement of core 23, member 25, and the several intermediate frusto-conical elements 57, four chambers of annular cross-section, which are extremely narrow but relatively wide and long, are formed and it is this association of parts which is relied upon to absorb the pressure energy of the carbonated water as it flows toward the nozzle without causing it to depart from streamline flow and become turbulent. The effect is such that the carbonated water is delivered at the lower end of this energy absorbing means at practically zero pressure, but without turbulence, and runs down the outer surface of the nozzle part 35 to drop into the waiting receptacle, the syrupy admixture simultaneously flowing through discharge tube 54 and being thus delivered into the receptacle centrally of the downflowing stream of carbonated water.

In the form of the invention shown in Figures 4 and 5 the several frusto-conical elements in the pressure reducing portion of the carbonated water duct are more widely conical, the elements thereof making larger angles with their common axis, and each is provided at its larger end with a plurality of inturned flange-like projections, the conical elements being indicated at 57' in these figures and the inturned flanges or lugs, which are spaced vertically from each other as shown, being indicated at 57². The core 23' in this case is a separately formed element and is normally pressed downwardly by means of a helical spring 60. Encircling the nozzle part 35' is a sleeve 61 connected by radial webs 62 to a ring 63 which encircles the sleeve 52', the web 62 extending, respectively, through vertical slots formed in sleeve 52'. The ring 63 is in position to be conveniently grasped by the operator and, by raising this ring the upper end of the sleeve 61 will be brought into contact with the annular lower end of the core 23', and the core thus lifted against the action of spring 60. As the core moves upwardly the inturned lugs 57² of the several frusto-conical members 57' will be successively engaged from below and eventually all three elements 57' will be lifted. The effect of this operation is to increase the widths of the several annular ducts defined by the core, the three frusto-conical elements 57', and the outer member 25' to permit the more ready flow of liquid therethrough so that, in the event that the control valve is operated when these several parts are positioned in the manner described, the spaces between the conical duct-defining surfaces may be flushed by liquid flowing under pressure and at high speed and thus cleaned. A pin 64 projects through the wall of member 25' and through slots formed in the several frusto-conical elements 57' into a slot 23² formed in member 23. The several slots formed in members 57' for the reception of pin 64 vary in length and as a result the upward movement of the outer element 57' is brought to a definite stop before the upward movement of the intermediate element 57', thus assuring that these members will be separated when the ring 63 is raised, separation of the innermost and intermediate elements 57' and separation of the innermost element from the core 23' being positively effected in like manner. After the flow of cleansing carbonated water has been terminated the core and elements 57' will be returned to original positions by the action of spring 60.

In each of the two forms of the invention selected for disclosure substantially the same type of means is employed for effecting the relatively slow uniform pressure drop in the carbonated liquid as it approaches the mouth of the discharge nozzle, while maintaining streamline flow. For a dispensing apparatus of the general type described the particular pressure reducing means illustrated is most practical, being of simple design and easily cleaned when necessary. The invention contemplates, however, other forms of the pressure reducing means which, especially when the problem of dispensing a fluid other than carbonated water is under consideration, may be considered to be eminently suitable. It will be understood, of course, that in the design of the pressure reducing means the character of the liquid which is to be dispensed must be given full consideration, especially its absolute viscosity and its density. It is appreciated for example that the absolute viscosity and density of a liquid to be handled should be known in order to determine the maximum velocity of flow which may be permitted to occur while maintaining streamline flow, i. e., without causing turbulence or transverse movements of the particles of flowing liquid. As previously stated, the flow of carbonated water from a tank to a receiving vessel should be streamline or non-turbulent if the loss of absorbed gas is to be minimized. Hence, as a primary consideration in the design of a pressure reducing means which comes within the import of the present invention it is first desirable to consider the nature of the liquid to be dispensed and to obtain some idea of the maximum permissible velocity of flow of that liquid which may be permitted without causing turbulence.

For any given liquid, under any given conditions, there exists a critical velocity the value of which depends upon the ratio of the inertia forces involved to the viscous forces. One method of determining the critical velocity of a given liquid flowing through a pipe or conduit involves the computation of what is called the Reynolds number for that liquid, the Reynolds number of the liquid being determined from the following equation:

$$R_e = \frac{\text{pipe diameter} \times \text{fluid velocity}}{\text{kinematic viscosity}}$$

or $$R_e = \frac{DV}{u/p}$$

where

D = pipe diameter
V = fluid velocity
u = absolute viscosity
p = density of liquid when the Reynolds number exceeds an upper critical value of from 2000 to 3000 turbulent flow occurs, whereas, when the Reynolds number is below this critical value streamline flow occurs.

With the knowledge in mind that the Reynolds number may not be exceeded if streamline flow is to be maintained, and that the diameter of the pipe through which the liquid flows, as well as the absolute velocity and density of the liquid are factors in the Reynolds number formula, the design of a specific means for effecting the necessary pressure drop in the flowing liquid can be undertaken with the aid of further formulae of proven value heretofore used in the design of conduits utilized for the transmission of flowing liquids.

It has been previously said that the carbonated liquid must be stored under considerable pressure. In this state, the liquid has potential, or "stored-up," energy by virtue of its pressure. Before the drink can come to rest in a glass or cup, this energy must be used up. One way of using up this potential energy, which is now almost universally used, is to allow the liquid to squirt out through a small nozzle. In this case, the potential energy is immediately converted into kinetic, or "velocity," energy, and causes the liquid to come rushing out at a velocity far above the "critical" velocity for streamline flow. The turbulent stream of liquid thus created hits violently into the glass, and the "velocity" energy is eventually turned into heat in the liquid through the violent turbulence of the liquid in the glass.

There is another way in which the potential, or "stored-up" energy of the liquid may be used up. This is by arranging to have the potential energy used up by the friction created during the flow of the liquid through the dispensing system. It is possible to use up virtually all of the energy of the liquid in friction, so that the liquid issues from the discharge end of the nozzle at atmospheric pressure, and virtually no velocity, and the present invention contemplates the utilization of a friction means for accomplishing this objective. In the design of such a means to act upon a selected liquid, which shall be capable of practical use, it is desirable to first consider the Reynolds number equation above set forth.

The kinematic viscosity is constant for a given liquid at fixed temperature, so that the Reynolds number varies as the product of the pipe diameter and the velocity. The significant feature of this is that, by making the pipe very small, we can make the velocity very high and still have the same Reynolds number, i. e., less than 3000, and maintain streamline flow.

The commonly used equation for flow of liquids in pipes is as follows:

$$h_f = f \cdot \left(\frac{L}{D}\right) \cdot \left(\frac{V^2}{2g}\right)$$

where:

$h_f$ = loss of pressure due to friction
$f$ = a coefficient depending on Reynolds number
$L$ = length of the pipe
$D$ = diameter of pipe
$V$ = velocity of flow
$g$ = acceleration due to gravity An examination of this formula shows that the loss of pressure due to friction in the pipe increases as the square of the velocity and inversely as the diameter of the pipe. Thus, if the pipe is made $\frac{1}{10}$ as large and the velocity increased ten times (as may be done without causing turbulent flow), the length of pipe needed to use up the pressure in the liquid under these conditions will only be $1/1000$ of what it was before. It is naturally necessary to increase the number of pipes as they are made smaller, in order to carry the same quantity of liquid. This increase must be in inverse proportion to the change in diameter. That is, if it is decided to reduce the diameter to $\frac{1}{10}$, and increase the velocity ten times, as above, then ten of the small pipes will be needed to carry the same quantity of liquid per second as the original pipe.

While it is possible to accomplish the desired result by the use of a number of small diameter tubes such a means has certain practical disadvantages, the chief of which are that the small tubes cannot readily be cleaned, and that a nozzle designed this way is not easily made adjustable for various pressures. It is therefore desirable to design some other means having the same characteristics. In so doing, however, it is desirable to give initial consideration to the essential features of such a nozzle.

The important characteristic of a small tube, which governs the friction loss in that tube, is the ratio:

$$\frac{\text{Cross section area}}{\text{Wetted perimeter}}$$

in other words, the ratio of the frictional surface to the thickness of the stream. This ratio is known as the "hydraulic radius." The significant point to note, in this connection is that all fluid ducts, of whatever cross sectional shape, will behave the same as regards friction loss, provided that they have the same "hydraulic radius." If it be assumed that N small tubes must be utilized in the construction of a nozzle of the type contemplated and that each has a diameter, inside, of D inches, the hydraulic radius of each tube is then:

$$= \frac{\text{X-section area}}{\text{Wetted perimeter}}$$

$$= \frac{\frac{\Pi D^2}{4}}{\Pi D} = \frac{D}{4}$$

The total area of all the tubes together is:

$N \times$ area of each $$= \frac{N \cdot \Pi D^2}{4}$$

What is desired, therefore, is a duct of some sort, so shaped that its $$\text{hydraulic radius} = \frac{D}{4}$$

and of such size that the $$\text{X-section area} = \frac{N \cdot \Pi D^2}{4}$$

The shape selected must also be easily cleaned, and susceptible of adjustment for different pressures. The shape that best fulfills these conditions is an annular duct, as illustrated in the drawings. To determine the hydraulic radius of this annular space:

$$\text{Hydr. rad.} = \frac{\text{X-section area}}{\text{Wetted surface}}$$

$$= \frac{\frac{\Pi}{4}(d_1^2 - d_2^2)}{\Pi(d_1 + d_2)}$$

$$= \frac{d_1 - d_2}{4}$$

It has been previously shown that in an ordinary cylindrical pipe, the $$\text{hydraulic radius} = \frac{D}{4}$$

Therefore, to get an annular space with the same flow characteristics as the ordinary pipe;

$$\frac{d_1 - d_2}{4} = \frac{D}{4} \qquad (1)$$

and $$\frac{\Pi}{4}(d_1^2 - d_2^2) = \frac{N \Pi D^2}{4} \qquad (2)$$

from (1)

$$d_1 - d_2 = D \qquad (3)$$

and from (2)

$$d_1^2 - d_2^2 = N D^2 \qquad (4)$$

Thus, if equations 3 and 4 are fulfilled, an annular duct with exactly the same flow characteristics as the ordinary cylindrical pipe is the result, and one which will, under identical conditions deliver the same quantity of fluid. It is of course necessary to determine, in designing liquid discharge devices embodying the invention, the length of such device or, if the length be established in advance, the other material dimensions of a device having such length and which is capable of functioning in the desired manner. As previously stated, the formula commonly used for calculating the flow of liquid in pipes is:

$$h_f = f \cdot \frac{L}{D} \cdot \frac{V^2}{2g}$$

where:

$h_f$ = loss of pressure due to friction
$f$ = a coefficient depending on Reynolds number
$L$ = length of the pipe
$D$ = diameter of pipe
$V$ = velocity of flow
$g$ = acceleration due to gravity Let quantity of liquid flowing per unit time = Q. Now $Q = AV$ where A is the area of the duct $$Q = \frac{\pi D^2 V}{4}$$

Thus $$V = \frac{4Q}{\pi D^2}$$

Substituting this value of V in the general equation $$h_f = f \cdot \frac{L}{D} \cdot \frac{\frac{16Q^2}{\pi^2 D^4}}{2g}$$

$$= f \cdot \frac{L}{D^5} \cdot \frac{16Q^2}{\pi^2 \cdot 2g}$$

In any specific design problem, it is desirable to keep the Reynolds number, and therefore the value $f$, constant. It is also desirable to design for some specific quantity of flow per unit time. Thus $f$ and $Q$ will be constants, and the flow equation may be written:

$$h_f = \frac{L}{D^5} \cdot \text{Constant}$$

This equation shows that the loss of pressure due to friction will vary directly as the length L of the passages, and inversely as the 5th power of the diameter D of these passages.

Thus, for every size of capillary space which may be selected, there is some definite length which must be used in order to create the desired friction loss in the liquid.

It will be understood that practical considerations will set limits upon the values of L and D which may be used. For example, if the diameter of the capillaries is made too large, then the necessary length becomes impractical. (An annular capillary with a ¼"-wide opening would have to be over a mile long to use up the same pressure energy as a 2"-long capillary with an opening .002 inch wide.)

Conversely, the value of D may not be too small, because such capillaries would be hard to make, prone to become plugged with tiny particles from the liquid, and so forth.

From the above, it will be seen that, for a given set of conditions, there is a positive relationship that must be maintained between the size of the capillaries and their length, if efficient performance is to be had.

It is a feature of the invention that this ratio of length to width of opening has been set in strict accordance with the equation:

$$h_f = \frac{L}{D^5} \cdot \text{Constant}$$

and that by this means there has been obtained efficiency of performance not otherwise attainable.

It is clear that, by following the method of design above set forth, various types of liquid velocity retarding arrangements may be originated, each having the ability to use up or consume the potential energy of a liquid by frictionally resisting its flow, while at the same time maintaining streamline or viscous movement of such liquid, the pressure and velocity of the issuing liquid stream both approaching zero.

Having thus described the invention, what is claimed as new and desired to be secured by Letters Patent is:

1. In a dispensing apparatus for liquids, in combination, a conduit leading from a source of supply to a discharge port, and means in said conduit immediately in advance of said discharge port dividing the same into a plurality of transversely elongated passages each of which is of such small cross section and of such length that the pressure energy of fluid passing therethrough is substantially consumed and the liquid is caused to issue therefrom and to pass through said discharge port at low velocity and in a non-turbulent manner.

2. In a dispensing apparatus for liquids, in combination, a conduit leading from a source of liquid supply to a discharge port, and means within the conduit and immediately in advance of said port for reducing the pressure energy of liquid flowing therethrough without causing turbulence, said means dividing the liquid current into a plurality of relatively long and wide but quite thin sheet-like or film-like streams.

3. The combination set forth in claim 2 in which said means includes elements having mutually facing closely spaced surfaces of revolution disposed concentrically about a common axis extending in the direction of fluid flow.

4. In a dispensing apparatus for liquids, in combination, a conduit leading to a discharge port, said conduit having a portion of tubular form, circular in interior cross section, immediately in advance of said port, a core coaxially disposed within said tubular portion, the mutually facing surfaces of the core and tubular portion being equidistantly spaced apart at all points, and means intermediate said mutually facing surfaces defining therewith a plurality of elongated narrow liquid ducts of annular cross section, for the purpose set forth.

5. The combination set forth in claim 4 in which the duct defining surfaces of the tubular portion of the conduit, the core and the intermediate means are frusto-conical.

6. The combination set forth in claim 4 in which the duct defining surfaces of the tubular portion of the conduit, the core and the intermediate means are frusto-conical and the core and intermediate means are axially movable relatively to the conduit and relatively to each other to permit widening of the liquid ducts when desired.

7. In a dispensing apparatus, in combination, a fluid conduit having adjacent its discharge end a section with a frusto-conical interior surface, a plurality of frusto-conical shells in nested relation to each other, the outermost shell being seated on said conical conduit interior surface, means resiliently maintaining said shells in nested relationship, and second means for effecting their relative axial movement against the action of said first means.

BRUCE G. COPPING.

REFERENCES CITED

The following references are of record in the file of this patent:

UNITED STATES PATENTS

| Number | Name | Date |
|---|---|---|
| 1,940,790 | Diehl | Dec. 26, 1933 |

FOREIGN PATENTS

| Number | Country | Date |
|---|---|---|
| 496,231 | Great Britain | Nov. 28, 1938 |